Figure 1:
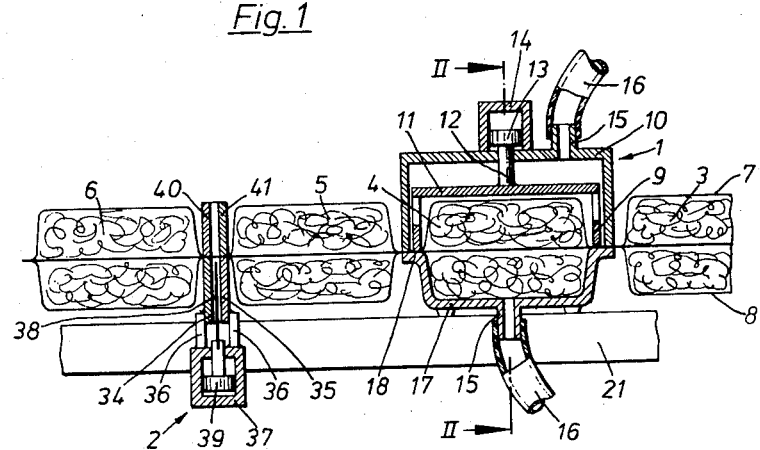

United States Patent [19]
Grebe

[11] 3,857,222
[45] Dec. 31, 1974

[54] PACKING MACHINE
[75] Inventor: Ludwig Grebe, Wallau, Germany
[73] Assignee: Kramer & Grebe KG Maschinen und Moldellfabrik, Wallau/Lahn, Germany
[22] Filed: Apr. 13, 1973
[21] Appl. No.: 350,911

[30] Foreign Application Priority Data
Apr. 15, 1972 Germany.......................... 2218334

[52] U.S. Cl. ................................. 53/112 A, 53/86
[51] Int. Cl. ........................................... B65b 31/02
[58] Field of Search ........................... 53/112 A, 86

[56] References Cited
UNITED STATES PATENTS
3,260,032  7/1966  Hill et al. .......................... 53/112 A
3,509,686  5/1970  Bergstrom ......................... 53/112 A Primary Examiner—Travis S. McGehee
Attorney, Agent, or Firm—Woodhams, Blanchard & Flynn

[57] ABSTRACT

A packing machine having a welding mechanism which is provided with a separate drive for welding two deformed foil sheets together and including an evacuating chamber which can be composed of two vertically movable halves one above the other. Each half of the evacuating chamber has on both sides at least one rack and each two racks are arranged in pairs and connected by a pinion.

7 Claims, 8 Drawing Figures

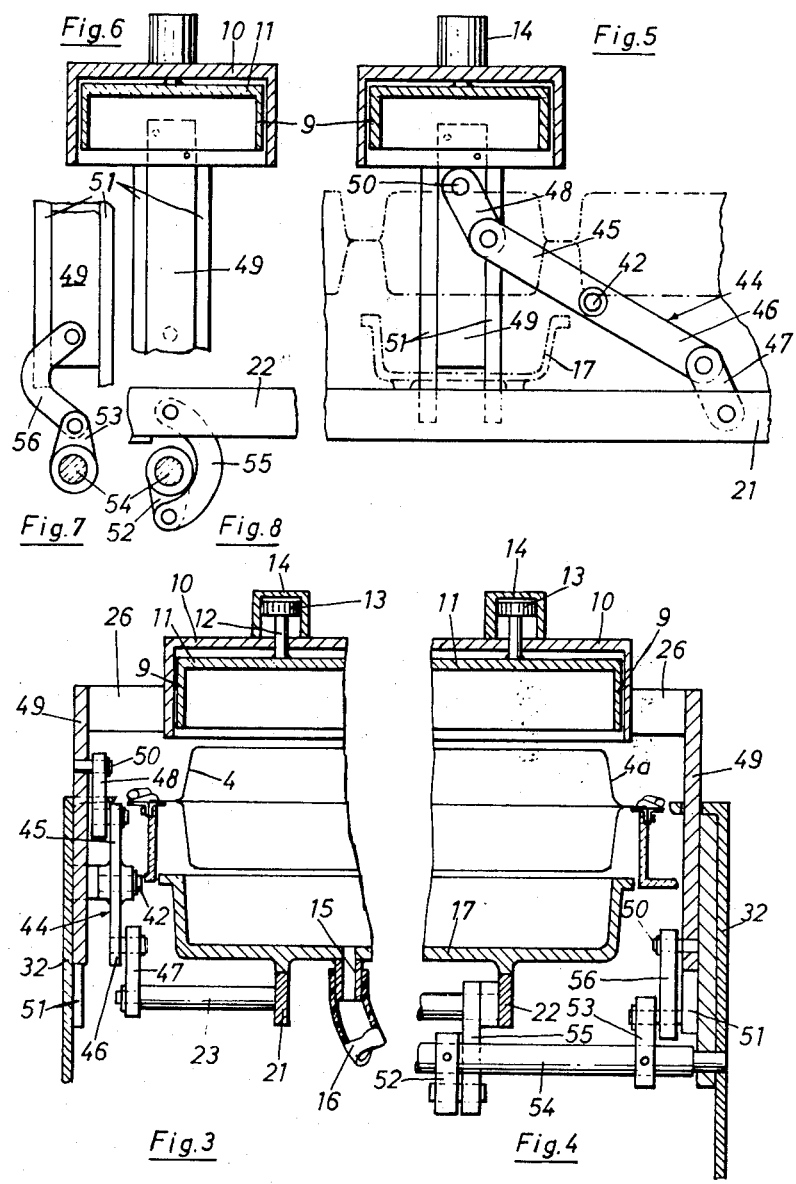

PACKING MACHINE

The invention relates to a packing machine having a frame-like constructed welding mechanism which is provided with a separate drive for welding of two containerlike deformed foil sheets and having an evacuating chamber which is composed of two boxlike halves which are both mounted for vertical movement toward and away from each other on opposite sides of the mentioned foil sheets and one half houses the framelike welding mechanism.

In machines of the mentioned type each half of an evacuating chamber has a separate drive. The chamber halves must be pressed together at a pressure which is greater than the required welding pressure. This means that the lower chamber half must be pressed on with a force which is substantially greater than is required for lifting and closing of the evacuating chamber. This in turn means that in the usual pneumatic or hydraulic drive of the chamber halves, the associated cylinders must have very large dimensions. This, on the one side, is expensive and, on the other side, creates difficulties in positioning this cylinder on the machines.

The purpose of the invention is to construct the drive of the mentioned chamber in such a manner that relatively small drives are sufficient.

According to the invention the packing machine is constructed such that on each half of the evacuating chamber and on both sides of the chamber, there is mounted at least one rack system and each of the racks, in the rack system, which are arranged in pairs to one another, are connected by a pinion.

A further embodiment of the invention is characterized in that the two halves of the evacuating chamber are connected by a lever gear which consists of two levers which are rotatable about a common axis of rotation and have an angle of 180° therebetween, which levers are engaged at equal distances from the pivot point by levers, the other ends of which are connected directly or indirectly to each one chamber half.

According to this inventive construction of the drive for the two halves of the evacuating chamber, the weight of the upper chamber half is a counterweight to the weight of the lower chamber half so that the drive must produce substantially only the contact pressure of the welding mechanism during the welding operation.

Figure 2:
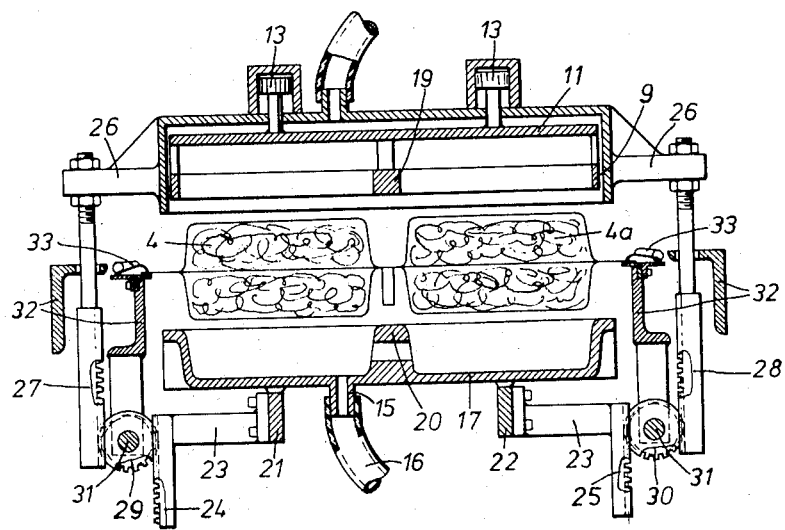

One exemplary embodiment of the invention will be described hereinafter in connection with the drawings, in which:

FIG. 1 is a longitudinal cross-sectional view of a portion of a packing machine according to the invention and FIG. 2 is a lateral cross-sectional view along the line II—II of FIG. 1, FIGS. 3 and 4 each are cross-sectional views of one half of a packing machine according to a further exemplary embodiment of the invention, FIG. 5 is a schematic and partially cross-sectioned side view of the drive system illustrated in FIG. 3, and FIGS. 6 to 8 are schematic and partially cross-sectioned side views of the drive system illustrated in FIG. 4.

FIG. 1 illustrates only a portion of the packing machine, namely an evacuating chamber 1, followed by a cutting mechanism 2 and plural filled packages 3 to 6.

The packages consist of two foil sheets 7 and 8. Each sheet is deformed into containers and the containers on both sheets form, when mated and welded together along the periphery of each of the containers, a unitized package filled with goods 3.

To weld the sheets together, a welding frame 9 is used which is mounted in the upper half 10 of the evacuating chamber 1. The frame 9 is secured to a plate 11 which is engaged by a piston rod 12 secured to a piston 13 axially movable in a cylinder 14. The piston is operated by a liquid or gaseous pressure medium. The supply lines and valves which are required for operating the cylinder 14 and piston 13 are not illustrated because they are known. A connection on the upper half 10 of the chamber 1 for an evacuating line 16 is identified with the reference number 15. The evacuating line 16 is connected to a vacuum pump which is not illustrated and with the help of which the package can be evacuated along its periphery prior to the welding operation. A similar line 16 is also connected to the lower half 17 of the chamber 1.

FIG. 1 illustrates the chamber 1 in the closed position and FIG. 2 illustrates the chamber in open position. One can recognize that the lower chamber half 17 is pressed against the upper chamber half 10 and forms with a continuous flange 18 at the same time an abutment for the welding frame 9.

As is illustrated in the exemplary embodiment of FIG. 2, the foils 7 and 8 form two side-by-side positioned rows of packages, the number of the rows may be lower or higher, however, depending on the size of the packages. The welding frame 9 has an intermediate web 19 secured to a plate 11 which in turn has two drive pistons 13 connected thereto. The lower half 17 of the evacuating chamber is divided into two sections and has a web 20 in the center thereof which serves as an abutment for the intermediate web 19 of the welding frame 9. The lower chamber 17 is mounted on vertically movable rails 21, 22. A rack 24 or 25 is secured on each rail by an arm 23. Arms 26 are mounted on both sides of the upper half 10 of the evacuating chamber 1. Racks 27, 28 are secured to the arms 26, namely in such a manner that one of the racks 27 or 28 is positioned opposite one of the racks 24 or 25, respectively. The rack pairs 24, 27 or 25, 28 each engage a pinion 29, 30, the shafts 31 of which are mounted on the frame 32 of the packing machine.

During a lifting of the rails 21, 22 by any convenient means not illustrated, the two chamber halves 10, 17 move toward one another and during a lowering of the rails, the chamber halves 10, 17 move away from one another. The weight of the upper chamber half 10 acts as a counterweight for the lower chamber half 17 so that the force required for driving is relatively small especially since the weight of the upper chamber half 10 is greater than the weight of the lower chamber half primarily because of the weight of the welding frame 9.

A pair of conveyor chains 33 having clamps thereon are guided on each frame half 32 of the machine frame. Both chains serve to transport the foils 7 and 8.

Considering the cutting mechanism 2, the rails 21, 22 are also used as knife carriers for they support two spaced parallel rails 34, 35 on which a cylinder 37 is secured through webs 36. A knife 38 is guided between the rails 34, 35, which knife can be lifted and lowered by a piston 39 in the cylinder 37. FIG. 1 illustrates the lifted knife shortly before carrying out the cutting operation. The rails 34 and 35 are lifted a distance to fixedly abut the vertically positioned rails 40, 41, which form the abutment for the welding seam which must be separated. Due to the fact that the welding seam is fixedly clamped between the mentioned rails 34, 35 and 40, 41, the seam is sufficiently cooled so that a cutting of the welding seam is possible without smearing or coating the knife 38 with still hot foil material. During a lifting of the rails 21, 22, the rails 34, 35 move also upwardly and the rails 40, 41 are lowered accordingly. The 40, 41 rails, if desired, can be secured to and movable with the upper half 10 of the chamber 1. That is, the coupling of the movements of the rails 34, 35 and of the rails 40, 41 is accomplished by the same arrangement as was described above for lifting and lowering of the two chamber halves 10 and 17.

In FIGS. 3 to 8, the same parts are identified with the same reference numerals used hereinabove. The drive mechanism for raising and lowering the chamber halves 10 and 17 illustrated in FIGS. 3 and 5 consists of a lever 44 which is hingedly supported at its center by means of a bolt 42 on the frame 32. Two levers 47, 48 engage the two arms 45, 46 of the lever 44 at equal distances from the bolt 42. The end of the lever 47 is connected to an arm 23 which in turn is fixedly connected to the rail 21 (FIG. 3) of the lower chamber half 17. The lever 48 engages a bolt 50 which is connected to a slide 49. The slide 49 in turn is fixedly connected through the arm 26 to the upper half 10 of the evacuating chamber 1 and is guided between two bars 51 secured to the frame 32.

During a lifting of the rail 21, the two chamber halves 10, 17 move toward one another and during a lowering of the rail they move away from one another. The coupling of the two movements is affected in this exemplary embodiment by the levers 44, 47 and 48 which forces an equally sized opposite movement of the chambers 10, 17.

The exemplary embodiment illustrated in FIGS. 4 and 6 to 8 differs from the aforedescribed in that in place of the double lever 44 two levers 52, 53 are provided which are secured on one common shaft 54. The levers 52, 53 have an equal length and are secured to and offset 180° on the shaft 54. A bent lever 55 is hinged to the lever 52, the other end of which bent lever engages the rail 22. A bent lever 56 engages the lever 53, the other end of which bent lever is connected to the slide 49 by a bolt 50A. The slide 49 engages an arm 26 of the upper chamber half 10 and is guided in the bars 51. The axis 54 and the two levers 52, 53 take over the task of the lever 44 in the aforedescribed embodiment. If the axis 54 is rotated, depending on the direction of rotation, then either the rail 22 and therewith the lower chamber half 17 is lifted and at the same time the upper chamber half 10 is lowered or vice versa the chamber half 17 is lowered and the chamber half 10 is lifted.

The embodiments of the invention in which an exclusive property or privilege is claimed are defined as follows:

1. In a packing machine have a framelike welding mechanism which is provided with a separate drive for welding of two container-like deformed foil sheets and having an evacuating chamber composed of two boxlike halves, a first half of which is mounted liftably and lowerably below, and the second half above, said foils and wherein one said half houses the framelike welding mechanism, the improvement comprising at least one rack system at each of two opposite sides of said chamber, each rack system having a pinion and two racks connected pairlike to each other by said pinion and in turn connected to respective chamber halves.

2. In a packing machine having a framelike welding mechanism which has a separate drive for welding together two container-like deformed foil sheets and having an evacuating chamber composed of two boxlike halves, of which a first half is mounted liftably and lowerably below, and the second half above, said foils and wherein one said half houses the framelike welding mechanism, the improvement comprising a lever system connecting the two halves of the evacuating chamber, said lever system comprising two lever elements rotatable about a common axis of rotation and circumferentially displaced by 180° from each other with respect to said axis, and further levers each connecting a corresponding one of said lever members at equal distances from said axis of rotation, the other ends of said further levers being coupled to corresponding ones of said chamber halves.

3. In a packing machine having a framelike welding mechanism provided with a separate drive for welding of two container-like deformed foil sheets and having an evacuating chamber composed of two boxlike halves, a first half of which is mounted liftably and lowerably below, and the second half above, said foils and wherein one said half houses the framelike welding mechanism, the improvement comprising in combination:

means fixedly located on said machine for defining a pivot axis;

coupling means fixed longitudinally of said pivot axis adjacent said evacuation chamber, said coupling means being pivotable about said pivot axis;

first and second elongate movable members each in positive driving engagement with said coupling means at points spaced on opposite sides of said pivot axis;

means positively connecting a remote end portion of each said elongate member to said first and second chamber halves, respectively, and responsive to movement of one said chamber half in a given direction for correspondingly moving the other said chamber half in the opposite direction;

whereby movement of one said chamber half results in simultaneous oppositely directed movements of both said chamber halves and the force required to lift one chamber half is at least partially compensated by the downward force of gravity on the other chamber half to reduce the net force required for opening and closing of said chamber.

4. The machine of claim 1 in which said pinion is mounted for rotation on an axis fixed with respect to said machine, the pinions of said rack systems being laterally displaced from each other on opposite sides of said evacuation chamber, said racks of each rack system being aligned vertically and being fixedly connected to respective ones of the first and second chamber halves through laterally extending members, said racks of each rack system engaging diametrically opposed sides of the corresponding pinion for moving equally but in opposite directions upon pinion rotation, whereby to cause an equal or opposite movement of one said chamber half in response to movement of the other said chamber half.

5. The machine of claim 1 including rails fixed with respect to respective ones of said first and second chamber halves and laterally displaced therefrom downstream along the path of travel of the container-like deformed sheets, the rails fixed with respect to said upper chamber half defining an upper parallel pair of spaced and upstanding rails disposed above the foil sheets, the rails fixed with respect to said lower container half comprising a lower parallel pair of spaced upstanding rails, which are substantially vertically aligned with said upper pair of rails on the opposite side of said foil, and including a knife guided between one said pair of rails for cutting through the foil and thereafter being guided between said upper pair of rails, and further including acuating means for said knife fixed with respect to one of said container halves.

6. The machine of claim 2 in which said two lever elements define opposite end portions of an elongate member centrally pivotly carried on said pivot axis, said pivot axis being disposed vertically between the points of connection of said other ends of said further levers to members fixed with respect to corresponding ones of said chamber halves, said elongate lever member having at least a vertical component of pivotal motion, whereby vertical movement of one of said chamber halves results in corresponding and opposite movement of the other chamber half, the weight of the upper chamber half acting as a counterweight to the weight of the lower chamber half so as to substantially reduce the force required to open and close said evacuation chamber.

7. The machine of claim 2 in which said two lever elements comprise two separate levers laterally displaced from each other and fixed to a common shaft extending transversely to the direction of movement of said chamber halves, said laterally displaced pair of levers being of equal length, said further levers being pivotly connected to the free ends thereof and being of bent configuration to curve around said shaft upon pivoting of said shaft to corresponding ones of a pair of rotational limits of said shaft, and including members fixed to and extending from said chamber halves for establishing said coupling of the other ends of said further levers to the corresponding ones of said chamber halves, whereby said lever system causes the weight of one said chamber half to act as counterweight to the weight of the other said chamber half and enables a substantially reduced force supplied to one said chamber half to effect opening and closing movement of both chamber halves.

* * * * *